US009209910B2

(12) United States Patent
Hedayati et al.

(10) Patent No.: US 9,209,910 B2
(45) Date of Patent: Dec. 8, 2015

(54) BLOCKER FILTERING FOR NOISE-CANCELLING RECEIVER

(71) Applicant: QUALCOMM Incorporated, San Diego, CA (US)

(72) Inventors: Hajir Hedayati, San Diego, CA (US); Wing Fat Andy Lau, San Diego, CA (US); Jeremy Darren Dunworth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/227,877

(22) Filed: Mar. 27, 2014

(65) Prior Publication Data
US 2015/0063509 A1   Mar. 5, 2015

Related U.S. Application Data

(60) Provisional application No. 61/871,990, filed on Aug. 30, 2013.

(51) Int. Cl.
*H04B 1/10* (2006.01)
*H04B 15/00* (2006.01)
*H04B 1/26* (2006.01)
*H04B 15/06* (2006.01)

(52) U.S. Cl.
CPC .............. *H04B 15/005* (2013.01); *H04B 1/26* (2013.01); *H04B 15/06* (2013.01)

(58) Field of Classification Search
CPC .... H04B 15/005; H04B 1/1027; H04B 1/109; H04B 1/28
See application file for complete search history.

(56) References Cited

U.S. PATENT DOCUMENTS

| 4,811,425 | A  |   | 3/1989  | Feerst                  |
|-----------|----|---|---------|-------------------------|
| 7,092,043 | B2 | * | 8/2006  | Vorenkamp et al. ... 348/726 |
| 7,336,940 | B2 |   | 2/2008  | Smithson                |
| 7,529,529 | B2 |   | 5/2009  | Taylor                  |
| 7,787,853 | B2 |   | 8/2010  | Belot et al.            |
| 7,949,322 | B2 |   | 5/2011  | Kim et al.              |
| 8,036,623 | B2 |   | 10/2011 | Chang et al.            |

(Continued)

FOREIGN PATENT DOCUMENTS

WO   2014133625 A2   9/2014

OTHER PUBLICATIONS

Darabi, H., "A Blocker Filtering Technique for SAW-Less Wireless Receivers," Solid-State Circuits, IEEE Journal of, vol. 42, No. 12, pp. 2766,2773, Dec. 2007.*

(Continued)

*Primary Examiner* — Daniel Washburn
*Assistant Examiner* — Amneet Singh
(74) *Attorney, Agent, or Firm* — Fountainhead Law Group P.C.

(57) ABSTRACT

Techniques for improving rejection of out-of-band interference in a noise-cancelling receive architecture. In an aspect, capacitors blocking in-band signals and passing through out-of-band signals destructively couple an auxiliary mixer output to a mixer output. In a further aspect, cross-coupling capacitors are provided to couple a first signal path with a second signal path of the noise-cancelling receive signal path. Baseband poly phase cross-coupling blocker filtering is further provided for out-of-band interference cancellation to create notch responses at blocker offset frequencies. The techniques disclosed may readily be adapted for multi-phase local oscillator systems.

20 Claims, 12 Drawing Sheets

(56) References Cited

U.S. PATENT DOCUMENTS

| | | | |
|---|---|---|---|
| 8,331,897 B2 | 12/2012 | Kim et al. | |
| 8,391,819 B2* | 3/2013 | Rajendran et al. | 455/307 |
| 8,406,358 B1 | 3/2013 | Uehara et al. | |
| 8,594,603 B2* | 11/2013 | Balankutty et al. | 455/296 |
| 8,660,041 B2 | 2/2014 | Niskanen et al. | |
| 8,666,352 B2* | 3/2014 | Jantzi et al. | 455/323 |
| 8,767,869 B2 | 7/2014 | Rimini et al. | |
| 2002/0032893 A1 | 3/2002 | Brooks et al. | |
| 2003/0186664 A1* | 10/2003 | Shah | 455/232.1 |
| 2006/0246861 A1* | 11/2006 | Dosanjh et al. | 455/147 |
| 2008/0175307 A1 | 7/2008 | Brunn et al. | |
| 2008/0227409 A1* | 9/2008 | Chang et al. | 455/78 |
| 2009/0011732 A1* | 1/2009 | Bayruns | 455/150.1 |
| 2010/0026547 A1 | 2/2010 | Weissman et al. | |
| 2010/0316172 A1 | 12/2010 | Keehr et al. | |
| 2011/0065412 A1* | 3/2011 | Beffa | 455/326 |
| 2011/0124307 A1 | 5/2011 | Balankutty et al. | |
| 2011/0227649 A1 | 9/2011 | Montalvo | |
| 2012/0019305 A1 | 1/2012 | Zhang et al. | |
| 2012/0238232 A1 | 9/2012 | Murphy et al. | |
| 2012/0299633 A1* | 11/2012 | Kim et al. | 327/357 |
| 2013/0035053 A1 | 2/2013 | Liao | |
| 2013/0135048 A1 | 5/2013 | Hyun et al. | |
| 2013/0271213 A1 | 10/2013 | Chung et al. | |
| 2014/0141740 A1* | 5/2014 | Mikhemar et al. | 455/226.1 |
| 2014/0269857 A1 | 9/2014 | Rimini et al. | |
| 2014/0329484 A1 | 11/2014 | Lau et al. | |
| 2014/0355728 A1* | 12/2014 | Liao et al. | 375/346 |
| 2014/0370833 A1* | 12/2014 | Din et al. | 455/326 |
| 2014/0378077 A1* | 12/2014 | Din et al. | 455/197.3 |

OTHER PUBLICATIONS

Werth, T. D.; Schmits, C.; Wunderlich, R.; Heinen, S., "An Active Feedback Interference Cancellation Technique for Blocker . Filtering in RF Receiver Front-Ends," Solid-State Circuits, IEEE Journal of, vol. 45, No. 5, pp. 989,997, May 2010.*

Murphy, D.; Darabi, H.; Abidi, A.; Hafez, A.A.; Mirzaei, A.; Mikhemar, M.; Chang, M.-C.F., "A Blocker-Tolerant, Noise-Cancelling Receiver Suitable for Wideband Wireless Applications," Solid-State Circuits, IEEE Journal of, vol. 47, No. 12, pp. 2943,2963, Dec. 2012.*

D. Murphy et al., "A Blocker-Tolerant Wideband Noise-Cancelling Receiver with a 2dB Noise Figure," ISSCC Dig. Tech. papers, pp. 74-76, Feb. 2012.*

International Search Report and Written Opinion—PCT/US2014/053396—ISA/EPO—Nov. 28, 2014.(133933WO).

Andrews C., et al., "A Passive-Mixer-First Receiver with Baseband-Controlled RF Impedance Matching, 27dBm Wideband IIP3", ISSCC Dig. Tech. Papers, Feb. 2010, pp. 46-47.

Blaakmeer S. C., et al., "The BLIXER, a Wideband Balun-LNA-I/Q-Mixer Topology", JSSC, Dec. 2008, pp. 2706-2715.

Borremans J., et al., "A sub-3dB NF Voltage-Sampling Front-End with +18dBm IIP3 and +2dBm Blocker Compression Point", Proceedings of ESSCIRC, 2010, pp. 402-405.

International Search Report and Written Opinion—PCT/US2014/035595—ISA/EPO—Oct. 16, 2014.

Mirzaie A., et al., "A 65nm CMOS Quad-Band SAW-Less Receiver for GSM/GPRS/EDGE", IEEE Symposium on VLSI Circuits, 2010, pp. 179-180.

Murphy D., et al., "A Blocker—Tolerant Wideband Noise—Cancelling Receiver Suitable for Wideband Wireless Applications" IEEE Journal of Solid-State Circuits, IEEE Service Center, Piscataway, NJ, USA, vol. 47, No. 12, Dec. 1, 2012, pp. 2943-2963, XP011485437, ISSN: 0018-9200, DOI: 10.1109/JSSC.2012.2217832 the whole document.

Murphy D., et al., "A Blocker—Tolerant Wideband Noise—Cancelling Receiver with a 2dB Noise Figure," ISSCC Dig. Tech. Papers, Feb. 2012, pp. 74-75.

Partial International Search Report—PCT/US2014/035595—ISA/EPO—Aug. 21, 2014.

Park C.S., et al., "Optimum Antenna Combining n. Presence of TX Leakage," Electronics Letters, Jan. 30, 2014, vol. 50 (3), pp. 223-225.

* cited by examiner

BLOCKER FILTERING FOR NOISE-CANCELLING RECEIVER

CROSS REFERENCE TO RELATED APPLICATIONS

This Application claims the benefit of priority to U.S. Provisional App. No. 61/871,990 filed Aug. 30, 2013, the content of which is incorporated herein by reference in its entirety for all purposes.

BACKGROUND

1. Field

The disclosure relates to integrated circuit (IC) design, and more particularly, to the design of noise-cancelling receivers.

2. Background

In the design of radio-frequency (RF) communications receivers, it is generally desirable to provide a low-noise front-end to overcome noise contributions from subsequent stages of the receive chain. Certain receiver front ends employ a noise-cancelling architecture, wherein signal currents generated by two signal paths are weighted and summed together to cancel noise and out-of-band interference in the received signal. Such an architecture may advantageously relax the design requirements of the front-end amplifier and mixers in the receive chain.

In certain implementations, a noise-cancelling architecture may include capacitors coupled to the mixer outputs to bypass undesired differential mode signal components (e.g., due to local oscillator feed-through or out-of-band blockers) as well as common mode signal components (e.g., due to RF signal feed-through or harmonic components at twice the local oscillator frequency). However, providing such capacitors may undesirably lower the input impedance peaking frequency of a transimpedance amplifier (TIA) of the receive chain, as well as degrade TIA linearity in the presence of out-of-band blockers. Furthermore, the capacitors may undesirably consume a significant amount of on-chip area.

Accordingly, it would be desirable to provide techniques to improve the performance of noise-cancelling receiver front ends by improving out-of-band interferer rejection and receiver linearity.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Figure 1:
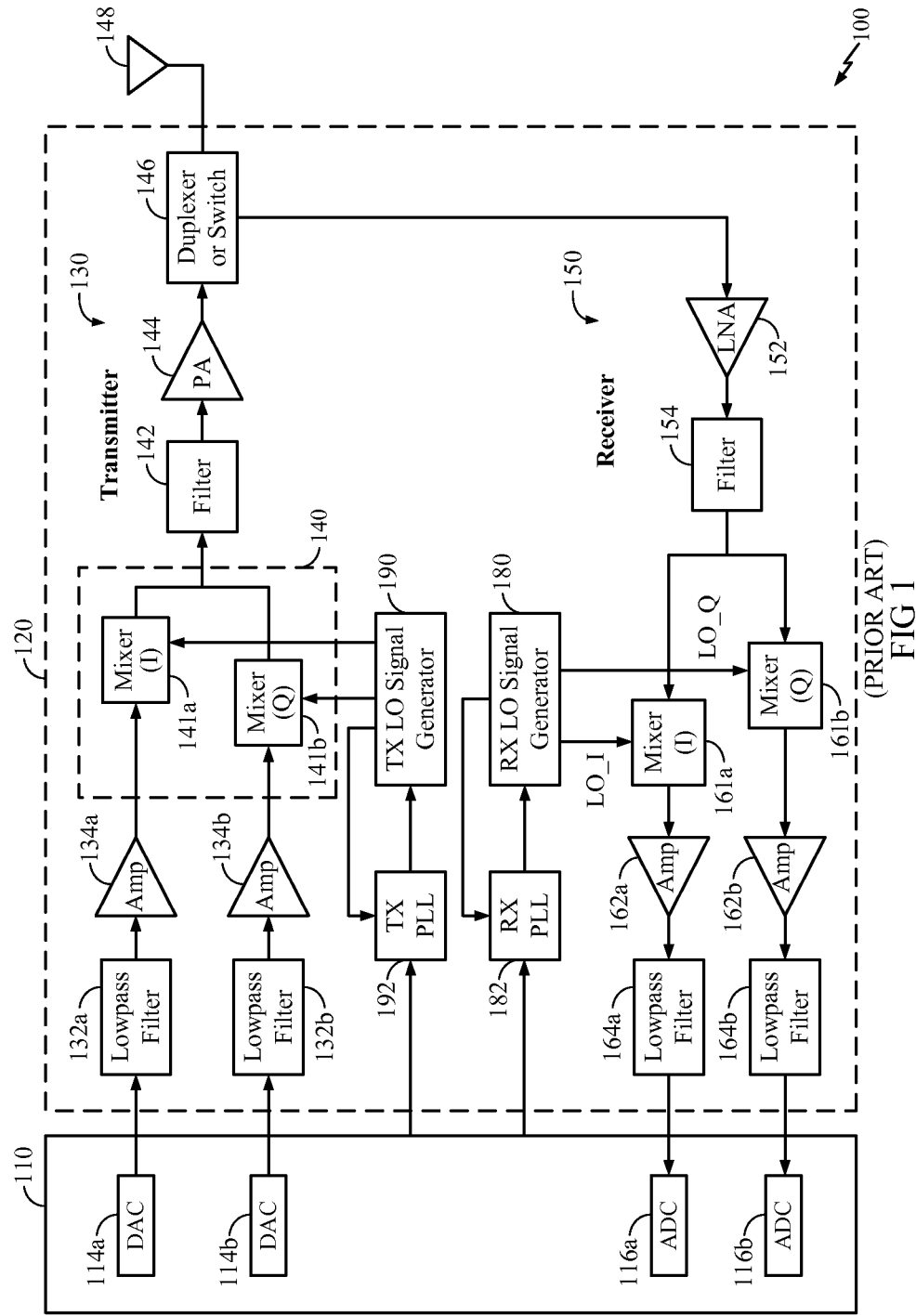
FIG. 1 illustrates a block diagram of a design of a prior art wireless communication device in which the techniques of the present disclosure may be implemented.

FIG. 1 illustrates a block diagram of a design of a prior art wireless communication device 100 in which the techniques of the present disclosure may be implemented. FIG. 1 shows an example transceiver design. In general, the conditioning of the signals in a transmitter and a receiver may be performed by one or more stages of amplifier, filter, upconverter, downconverter, etc. These circuit blocks may be arranged differently from the configuration shown in FIG. 1. Furthermore, some blocks shown in FIG. 1 may be absent in some implementations, whereas other circuit blocks not shown in FIG. 1 may also be used to condition the signals in the transmitter and receiver. Unless otherwise noted, any signal in FIG. 1, or any other figure in the drawings, may be either single-ended or differential. Some circuit blocks in FIG. 1 may also be omitted.

In the design shown in FIG. 1, wireless device 100 includes a transceiver 120 and a data processor 110. The data processor 110 may include a memory (not shown) to store data and program codes. Transceiver 120 includes a transmitter 130 and a receiver 150 that support bi-directional communication. In general, wireless device 100 may include any number of transmitters and/or receivers for any number of communication systems and frequency bands. All or a portion of transceiver 120 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the design shown in FIG. 1, transmitter 130 and receiver 150 are implemented with the direct-conversion architecture.

In the transmit path, data processor 110 processes data to be transmitted and provides I and Q analog output signals to transmitter 130. In the exemplary embodiment shown, the data processor 110 includes digital-to-analog-converters (DAC's) 114a and 114b for converting digital signals generated by the data processor 110 into the I and Q analog output signals, e.g., I and Q output currents, for further processing. Within transmitter 130, lowpass filters 132a and 132b filter the I and Q analog output signals, respectively, to remove undesired images caused by the prior digital-to-analog conversion. Amplifiers (Amp) 134a and 134b amplify the signals from lowpass filters 132a and 132b, respectively, and provide I and Q baseband signals. An upconverter 140 upconverts the I and Q baseband signals with I and Q transmit (TX) local oscillator (LO) signals from a TX LO signal generator 190 and provides an upconverted signal. A filter 142 filters the upconverted signal to remove undesired images caused by the frequency upconversion as well as noise in a receive frequency band. A power amplifier (PA) 144 amplifies the signal from filter 142 to obtain the desired output power level and provides a transmit RF signal. The transmit RF signal is routed through a duplexer or switch 146 and transmitted via an antenna 148.

In the receive path, antenna 148 receives signals transmitted by base stations and provides a received RF signal, which is routed through duplexer or switch 146 and provided to a low noise amplifier (LNA) 152. The duplexer 146 is designed to operate with a specific RX-to-TX duplexer frequency separation, such that RX signals are isolated from TX signals (e.g., without necessarily using a transmit/receive switch). This enables frequency division duplex (FDD) operation, while embodiments with a transmit/receive switch at 146 may be limited to time division duplex (TDD) operation. The received RF signal is amplified by LNA 152 and filtered by a filter 154 to obtain a desired RF input signal. Downconversion mixers 161a and 161b mix the output of filter 154 with I and Q receive (RX) LO signals (i.e., LO_I and LO_Q) from an RX LO signal generator 180 to generate I and Q baseband signals. The I and Q baseband signals are amplified by amplifiers 162a and 162b and further filtered by lowpass filters 164a and 164b to obtain I and Q analog input signals, which are provided to data processor 110. In the exemplary embodiment shown, the data processor 110 includes analog-to-digital-converters (ADC's) 116a and 116b for converting the analog input signals into digital signals to be further processed by the data processor 110.

In FIG. 1, TX LO signal generator 190 generates the I and Q TX LO signals used for frequency upconversion, while RX LO signal generator 180 generates the I and Q RX LO signals used for frequency downconversion. Each LO signal is a periodic signal with a particular fundamental frequency. A PLL 192 receives timing information from data processor 110 and generates a control signal used to adjust the frequency and/or phase of the TX LO signals from LO signal generator 190. Similarly, a PLL 182 receives timing information from data processor 110 and generates a control signal used to adjust the frequency and/or phase of the RX LO signals from LO signal generator 180.

Optionally, a balun (not shown in FIG. 1) may be provided between the output of the LNA 152 and the mixers 161a, 161b of the receiver 150. The balun may convert a single-ended signal to a differential signal, and may include, e.g., a transformer that mutually couples a signal from a primary winding to a secondary winding.

Figure 2:
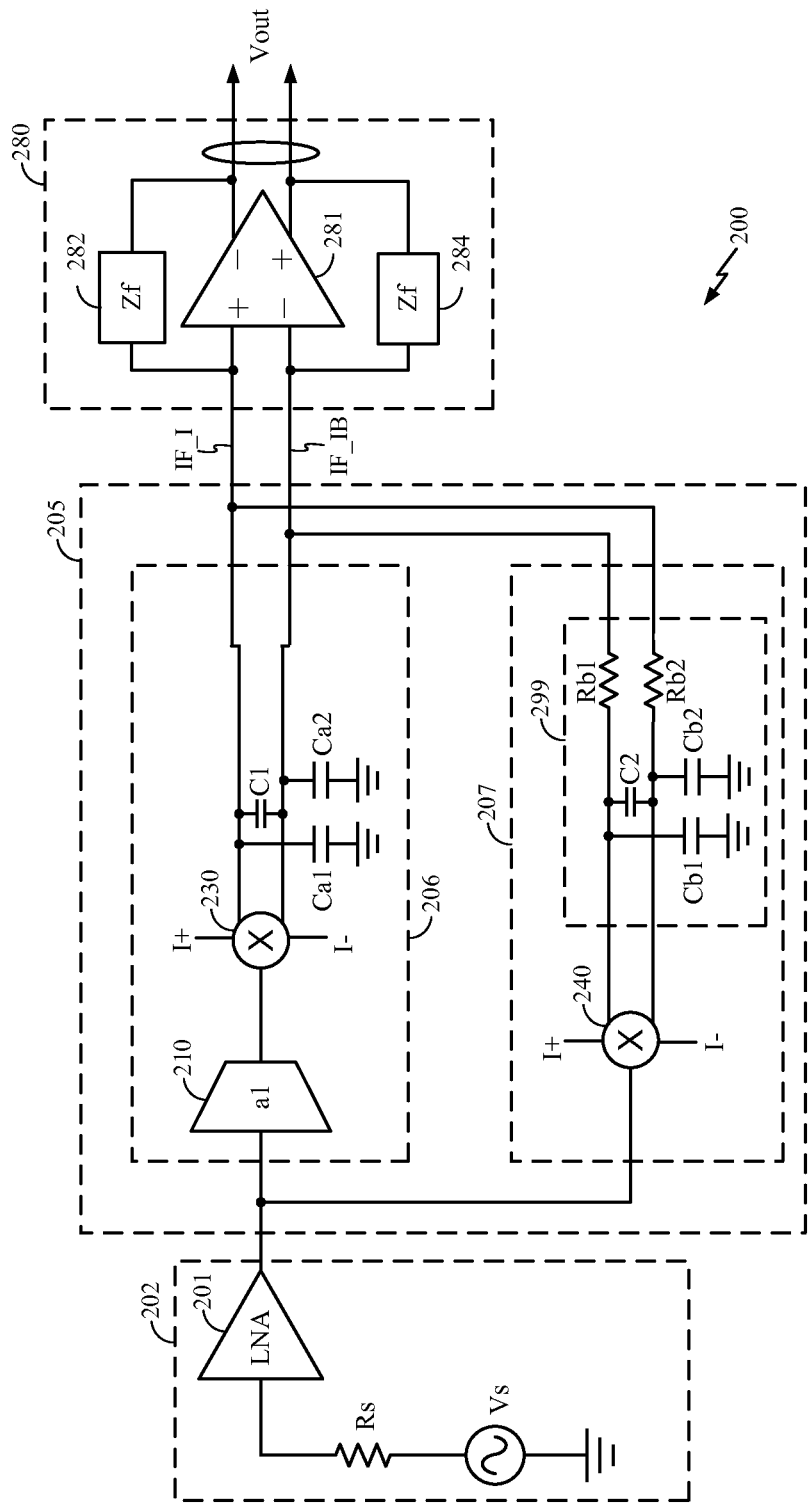
FIG. 2 illustrates an implementation of a noise-cancelling receiver front end.

In certain implementations, certain front end elements of the receiver 150 may be replaced by a noise-cancelling receiver architecture to improve noise performance. FIG. 2 illustrates an implementation 200 of a noise-cancelling receiver front end. Note the implementation 200 is shown for illustrative purposes only, and is not meant to limit the scope of the present disclosure. Further details of a noise-cancelling receiver front end are described in co-pending U.S. patent application Ser. No. 13/875,093, filed May 1, 2013, assigned to the assignee of the present disclosure, and explicitly incorporated by reference herein.

In FIG. 2, a front-end portion (FE) 202 has in input signal which is represented by an input voltage Vs with a source resistance Rs. The input signal, which may come for example from Antenna 148 or duplexer or switch 146 from FIG. 1, is coupled to the input of LNA 201. In certain implementations, LNA 201 may correspond to, e.g., LNA 152 of transceiver 120 of FIG. 1, although it will be understood that LNA 201 need not be implemented in the wireless device 100 of FIG. 1. The output of LNA 201, also denoted herein as an input signal, is coupled to the input of receive signal path 205.

Receive signal path 205 includes a first signal path 206 having a trans-conductor 210 with trans-conductance a1. Note in certain implementations, a1 may be configurably set to any transconductance value. For example, a1 may be chosen to correspond to, e.g., $-1/|Z_{oLNA}|$, wherein $Z_{oLNA}$ is the output impedance of LNA 201, and $|Z_{oLNA}|$ is the magnitude thereof. Note in general, $Z_{oLNA}$ may be complex, while in certain exemplary embodiments, $Z_{oLNA}$ may preferably be real to better cancel noise originating from Rb1, Rb2 and/or a trans-impedance amplifier (TIA) 280 as further described hereinbelow. In an implementation, a1 may further be adjusted to account for differences in conversion gain between first and second signal paths 206, 207, as further described hereinbelow. In this example, by adding the LNA 201, the noise-cancellation of path 207 may no longer be a function of the poorly controlled impedance of antenna 148. The LNA 201 may also prevent a high LO leakage to the antenna 148.

The output of trans-conductor 210, which corresponds to a signal derived from the input signal, is coupled to first mixer 230, which mixes its input signal (output of trans-conductor 210) with a differential local oscillator (LO) signal (I+, I−) to generate a lower-frequency signal, e.g., an intermediate frequency (IF) or baseband frequency signal. Note capacitors Ca1, Ca2 are provided to couple terminals of the differential output of first mixer 230 to ground. In an implementation, the capacitances of Ca1 and Ca2 may be equal to each other, e.g., both equal to a common value Ca. A capacitor C1 may further be provided to couple the nodes of the differential output of first mixer 230 to each other.

Receive signal path 205 further includes a second signal path 207. Second signal path 207 includes a second mixer 240, which may preferably be a passive mixer, and whose differential output is coupled to a baseband resistance-capacitance (R-C) network 299. In particular, R-C network 299 may include capacitors Cb1, Cb2 coupling each node of the differential output of second mixer 240 to ground. In an implementation, the capacitances of Cb1 and Cb2 may be equal to each other, e.g., both equal to a common value Cb. In an implementation, Cb1 and Cb2 may correspond to parasitic capacitances associated with other circuit elements, and need not correspond to, e.g., explicitly provided capacitors in the design.

In FIG. 2, capacitor C2 is further provided to couple the nodes of the differential output of second mixer 240 to each other. R-C network 299 further includes resistors Rb1, Rb2 configured to series-couple the differential output nodes of second mixer 240 to the differential output of first signal path 206. In an implementation, the resistances Rb1 and Rb2 may be equal to each other, e.g., both equal to a common value Rb.

The differential output of receive signal path 205, including signals IF_I and IF_IB, is derived from the differential output of first signal path 206 combined with the differential output of second signal path 207. IF_I and IF_IB are further coupled to the differential input of trans-impedance amplifier (TIA) 280. Note TIA 280 may generally be implemented using techniques known to one of ordinary skill in the art, and its implementation in FIG. 2 is shown for illustrative purposes only. In particular, a fully differential operational amplifier 281 may be provided with feedback elements 282, 284, wherein the impedances of the feedback elements 282, 284 are represented as having a common value Zf. It will be appreciated that the configuration of TIA 280 in the manner shown effectively sums the output signal currents from the first and second signal paths 206, 207 together to generate a voltage output Vout.

In an implementation, either or both of mixers 230, 240 may be implemented as passive (e.g., single- or double-balanced) mixers. Accordingly, within the signal bandwidth of the R-C network 299 determined by Rb1, Rb2, Cb1, Cb2, and C2, the equivalent parallel load resistance (as seen by the output of LNA 201 at the LO frequency) may be adjusted by appropriately choosing Rb1 and Rb2, or Rb. It will be appreciated that the choice of Rb may affect the frequency selectivity and voltage gain of LNA 201, and thus may also affect the amount of noise that is left uncancelled appearing at the output voltage Vout of TIA 280. In an exemplary embodiment, Rb may be chosen to provide an input impedance for first and second signal paths 206, 207 that is substantially equal to |ZoLNA|.

Note outside the signal bandwidth of R-C network 299, the magnitude of the input impedance of second signal path 207 decreases as input frequency deviates from the LO frequency, on both the low-side and the high-side. This may be due to, e.g., loading present at the outputs of second mixer 240. The decreased impedance reduces the voltage amplitude at the inputs of first signal path 206 and second signal path 207 outside the signal bandwidth of the R-C network 299. Accordingly, R-C network 299 effectively provides band-pass selectivity to reject out-of-band signals, e.g., out-of-band jammers and/or Tx signals coupled from a transmitter portion of the transceiver (not shown in FIG. 2), since such signals would be greatly attenuated prior to mixing in the first and second signal paths 206, 207.

It will further be appreciated that Ca1, Ca2, Cb1, Cb2 may advantageously bypass (e.g., to ground) undesired differential mode components (e.g., due to LO feed-through, out-of-band blockers, etc.) and common mode components (e.g., due to RF feed-through, second-order LO components, etc.). C1 and C2 may also suppress differential blocker components.

Note while only one mixer is shown in each of signal paths 206, 207 for ease of illustration, it will be appreciated that the discussion herein readily applies to signal paths accommodating more than one mixer each. For example, first and second receive signal paths 206, 207 may each include an I-mixer and a Q-mixer (i.e., two mixers), with each mixer configured analogously to the manner in which the corresponding single mixers are shown configured in FIG. 2. Furthermore, techniques of the present disclosure may readily be applied to accommodate multi-phase local oscillator configurations, e.g., employing more than two phases, as further described hereinbelow with reference to FIG. 9.

Note that the amount of rejection of out-of-band interferers (e.g., as determined by the quality factor or Q of the aforementioned band-pass selectivity) may be limited by the on-resistance of second mixer 240 in a passive mixer implementation. Furthermore, in certain scenarios, larger values for the capacitances C1, Ca1, and/or Ca2 may limit peaking amplitude, while at the same time reduce the peaking frequency. This reduction in peaking frequency may undesirably increase voltage swing throughout the receiver chain (e.g., due to effective passing through greater amounts of interferers that are close in frequency to the desired signal), and thereby degrade linearity.

Per the above rationales, and further considering that the capacitors may require significant die area for implementation, it would be desirable to provide improved techniques for reducing or eliminating the capacitances needed for implementing a noise-cancelling receiver.

Figure 3:
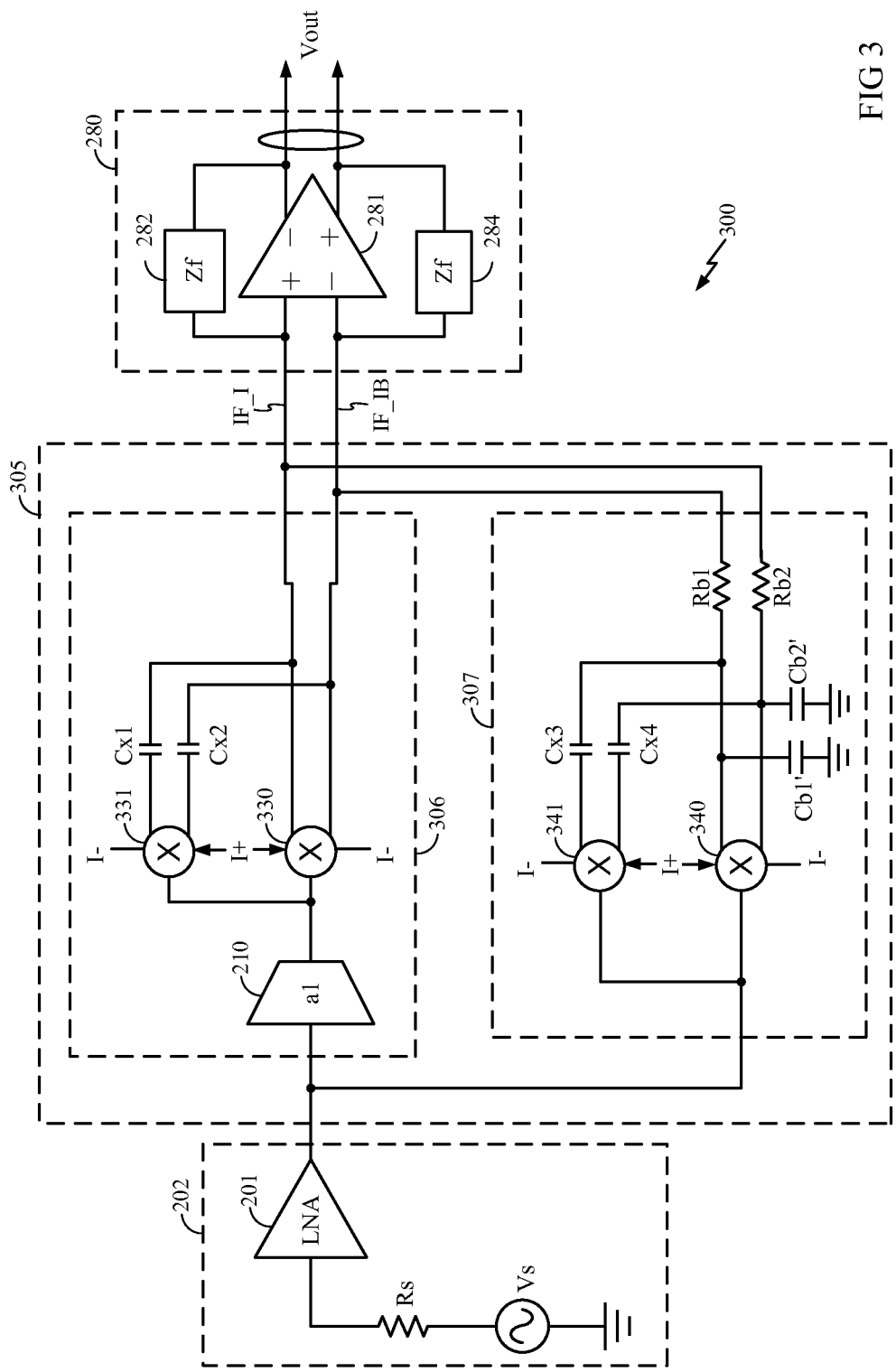
FIG. 3 shows an exemplary embodiment of the present disclosure, wherein additional mixers are further coupled in parallel with the mixers to improve noise cancellation and blocker filtering in the receiver.

FIG. 3 shows an exemplary embodiment 300 of the present disclosure, wherein additional mixers are further coupled in parallel with the mixers to improve blocker rejection in the receiver. Note FIG. 3 is shown for illustrative purposes only, and is not meant to limit the scope of the present disclosure.

In FIG. 3, receive signal path 305 includes first signal path 306 and second signal path 307. First signal path 306 includes a trans-conductor 210 having output coupled to the inputs of parallel-coupled mixers, including a first mixer 330 and a first auxiliary mixer 331. In particular, first mixer 330 performs functions similar to those described for first mixer 230 in FIG. 2. The first auxiliary mixer 331, having an input coupled to the input of first mixer 330, further includes differential outputs coupled to the differential outputs of first mixer 330 via capacitors Cx1, Cx2. In an exemplary embodiment, the capacitances of Cx1 and Cx2 may be equal to each other, e.g., both equal to a common value Cx.

Note the differential LO input to first auxiliary mixer 331 is configured such that the differential output signal of first auxiliary mixer 331 is ideally 180 degrees out of phase with the differential output signal of first mixer 330 when the outputs of mixers 330 and 331 are combined together. In the exemplary embodiment shown, such "anti-phase" coupling is implemented by coupling the differential LO signal to the inputs of first mixer 330 and first auxiliary mixer 331 in the manner shown, i.e., to have opposite phase with respect to one another (e.g., I+, I− for first mixer 330, and I−, I+ for first auxiliary mixer 331). In alternative exemplary embodiments, the anti-phase coupling may be implemented by, e.g., appropriately cross-routing the differential outputs of first mixer 330 and first auxiliary mixer 331 to each other, etc. Such alternative exemplary embodiments are contemplated to be within the scope of the present disclosure.

In an exemplary embodiment, the value of Cx may be chosen such that Cx presents a high impedance to signals within the receive signal bandwidth. Conversely, Cx may present a low impedance to signals outside the receive signal bandwidth, in which case the differential output of first auxiliary mixer 331 would add destructively (e.g., in a manner such as to cause destructive interference) with the differential output of first mixer 330. In such an exemplary embodiment, the levels of such interferers outside the receive signal bandwidth would be reduced not only at the output of transconductor 210, but also at the output of receive signal path 305, thus improving the linearity of receiver 300.

According to principles analogous to those disclosed herein above for first signal path 306, second signal path 307 includes second mixer 340 coupled in parallel with second auxiliary mixer 341. It will be appreciated that similar anti-phase coupling principles apply to the provision of second auxiliary mixer 341 and associated capacitors Cx3, Cx4 to further reject out-of-band interferers at the output of LNA 201 by lowing the impedance |ZoLNA| at interferer frequency and cancel out-of-band interferers at the output of second signal path 307. In an exemplary embodiment, Cx3 and Cx4 may be equal to each other, e.g., both equal to the common value Cx, and accordingly may also be equal to Cx1 and Cx2 of first signal path 306.

In alternative exemplary embodiments (not shown), any or all of capacitors Cx1, Cx2, Cx3, Cx4 may generally be replaced with a block having any type of frequency response characteristic, e.g., high-pass filter, band-reject filter, or notch filter characteristic, that achieves the design objectives described hereinabove for Cx. Such exemplary embodiments are contemplated to be within the scope of the present disclosure.

Note the capacitors C1, Ca1, and Ca2 present in the receive signal path 205 of FIG. 2 are not present in receive signal path 305, thus advantageously saving the on-chip area required to implement those capacitors. The omission of C1, Ca1, and Ca2 from receiver block 305 may nevertheless yield acceptable receiver performance, as LO feed-through in the circuitry of receive signal path 305 is significantly cancelled due to the anti-phase coupling described hereinabove. In an exemplary embodiment, Cb1' and Cb2' of second signal path 307 may also be reduced in value, and thus size, versus Cb1 and Cb2 of second signal path 207. In an exemplary embodiment, Cb1' and Cb2' may correspond to parasitic capacitances associated with other circuit elements, and need not correspond to, e.g., explicitly provided capacitors in the design.

In certain exemplary embodiments, the significant cancellation of LO feed-through afforded by anti-phase mixer pairs 330, 331 and 340, 341 may also advantageously allow the use of simpler single-balanced mixer designs (as opposed to, e.g., double-balanced mixer designs). Advantages of a single-balanced mixer design include eliminating the need for a balun to interface a single-ended LNA with a differential mixer. Furthermore, the TIA input impedance peaking frequency may be increased, as, e.g., parasitic capacitances Ca1, Ca2 (not shown in FIG. 3) associated with a single-balanced implementation of mixer 330 may be much less than the corresponding parasitic capacitances for a double-balanced mixer implementation. It will be appreciated that a further advantage of using single-balanced mixers is that no additional single-ended-to-differential conversion need be performed prior or after LNA 201.

Figure 4:
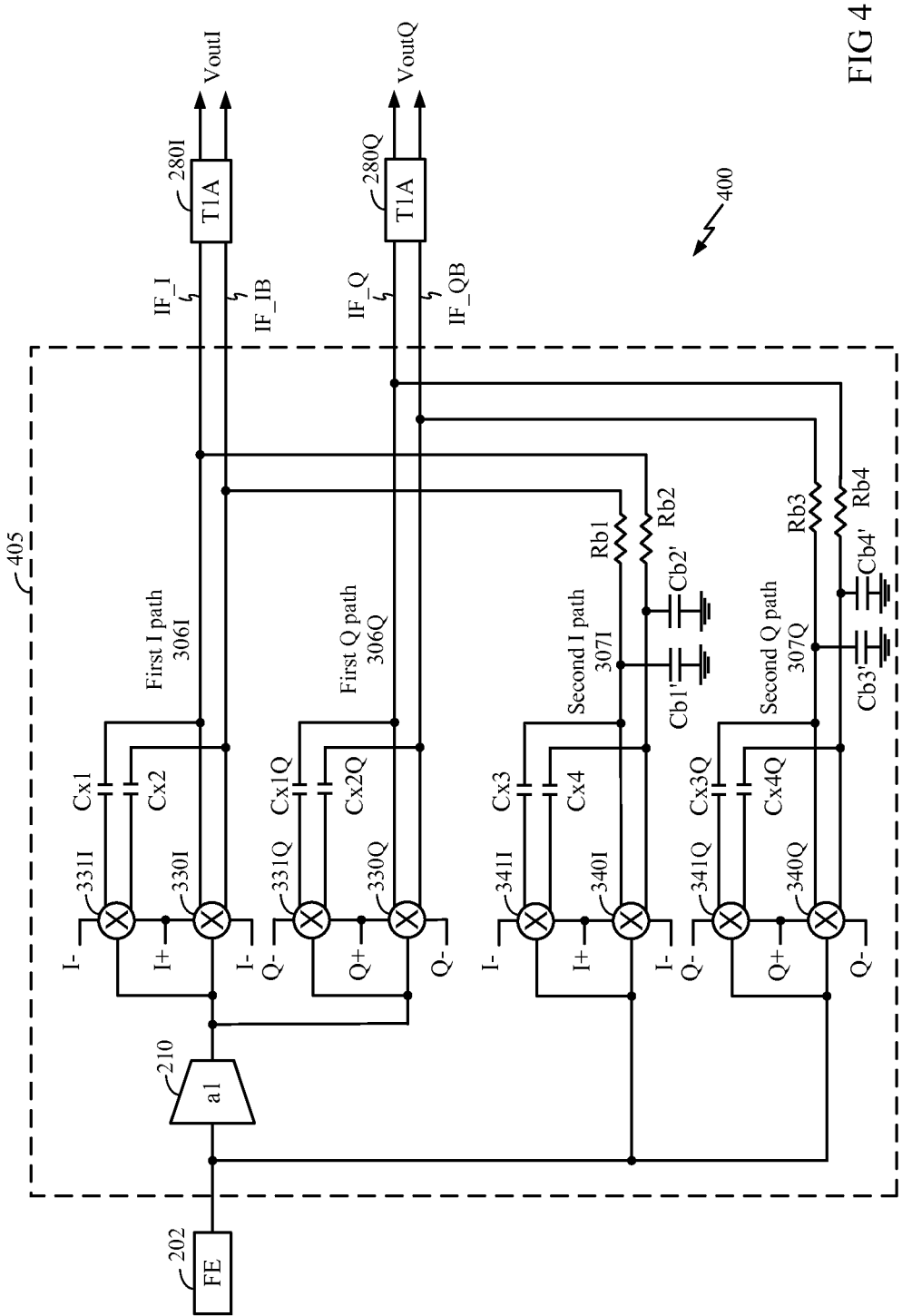
FIG. 4 illustrates an alternative exemplary embodiment incorporating the anti-phase coupling techniques in a quadrature down-conversion noise-cancelling receiver.

In certain exemplary embodiments, the techniques for anti-phase coupling disclosed herein may readily be applied to receivers incorporating more than one local oscillator phase. FIG. 4 illustrates an alternative exemplary embodiment incorporating the anti-phase coupling techniques in a quadrature down-conversion noise-cancelling receiver 400. In FIG. 4, receive signal path 405 includes first I (in-phase) path 306I with first mixer 330I and first auxiliary mixer 331I having outputs coupled in anti-phase configuration via capacitors Cx1 and Cx2. Receive signal path 405 further includes first Q (quadrature) path 306Q with first mixer 330Q and first auxiliary mixer 331Q also having outputs coupled in anti-phase configuration via capacitors Cx1Q and Cx2Q. Note the local oscillators provided to first I path 306I and first Q path 306Q may be offset in phase, e.g., (I+, I−) may correspond to a differential in-phase LO signal, while (Q+, Q−) may correspond to a differential quadrature LO signal.

Receive signal path 405 further includes second I path 307I having second mixer 340I and second auxiliary mixer 341I coupled with capacitors Cx3 and Cx4, and second Q path 307Q having second mixer 340Q and second auxiliary mixer 341Q coupled with capacitors Cx3Q and Cx4Q.

In FIG. 4, it will be appreciated that the differential output of second I path 307I is coupled via resistors Rb1, Rb2 to the differential output of first I path 306I, while the differential output of second Q path 307Q is coupled via resistors Rb3, Rb4 to the differential output of first Q path 306Q. Per the techniques described hereinabove, receive signal path 405 generates an in-phase differential output current represented by signals IF_I, IF_IB corresponding to the in-phase portion of the noise-cancelled down-converted signal, and provides the in-phase differential output current to the input of in-phase TIA 280I. Receive signal path further generates a quadrature differential output current represented by signals IF_Q, IF_QB corresponding to the quadrature portion of the noise-cancelled down-converted signal, and provides the quadrature differential output current to the input of quadrature TIA 280Q. TIA's 280I, 280Q generate differential output voltages VoutI, VoutQ, respectively.

Figure 5:
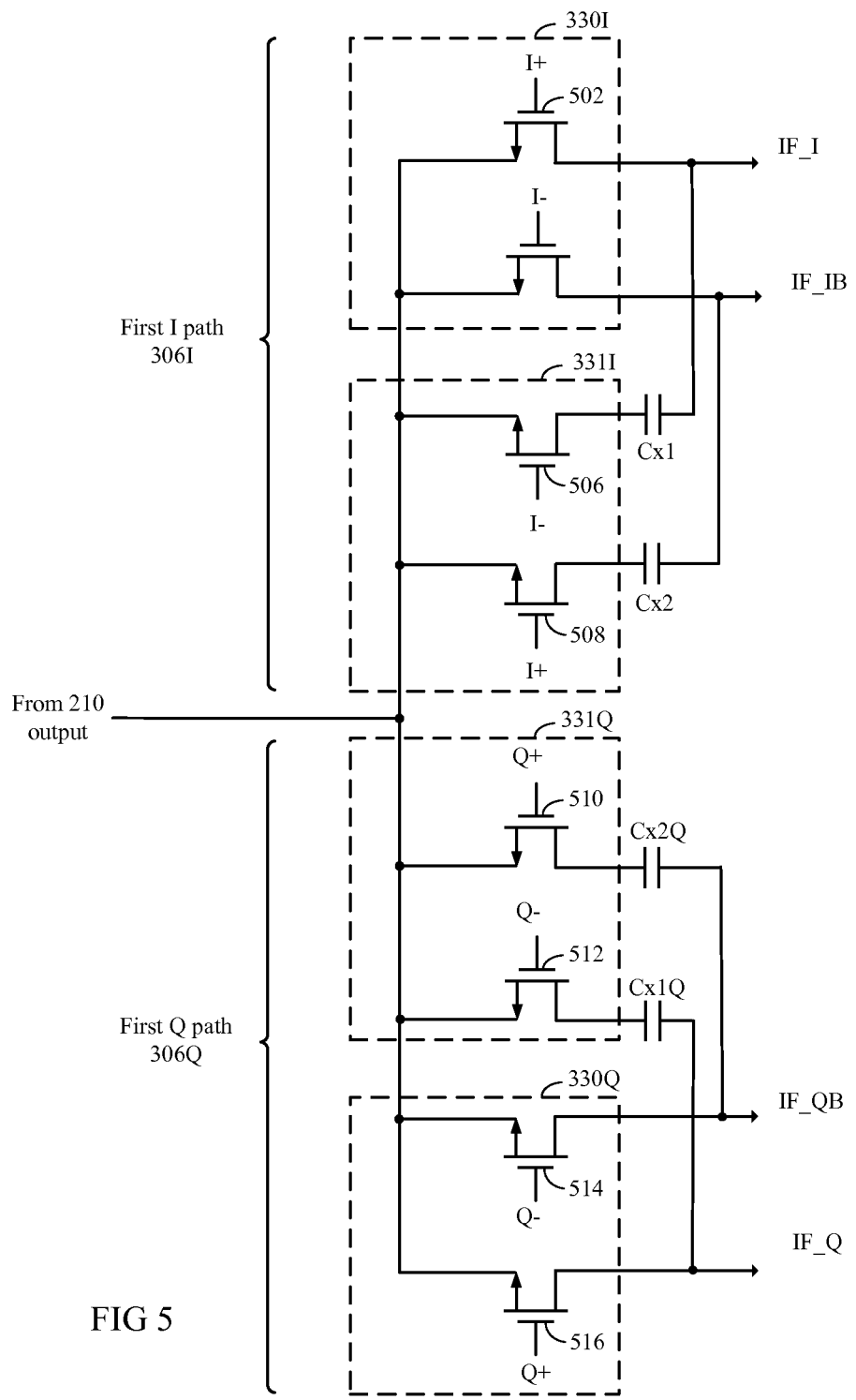
FIG. 5 illustrates an exemplary embodiment of a single-balanced mixer implementation of certain portions of the receive signal path in FIG. 4.

FIG. 5 illustrates an exemplary embodiment of a single-balanced mixer implementation of certain portions of the receive signal path 405 in FIG. 4. Note the particular implementation of receive signal path 405 in FIG. 5 is shown for illustrative purposes only, and is not meant to limit the application of the single-balanced mixer topology to any particular mixers described herein.

In FIG. 5, the two mixers 330I, 331I of first I path 306I are implemented using a total of four transistors, e.g., transistors 502, 504 for mixer 330I, and transistors 506, 508 for mixer 331I. One of ordinary skill in the art will appreciate that each single-balanced mixer may generally be implemented using two transistors, as opposed to, e.g., four transistors for a double-balanced mixer. Further shown in FIG. 5 are the two mixers 330Q, 331Q of first Q path 306Q implemented using four transistors, e.g., transistors 516, 514 for mixer 330Q, and transistors 512, 510 for mixer 331Q. Note the input to the mixers shown in FIG. 5 may be derived from the output of transconductor 210, and may be common to both first I path 306I and first Q path 306Q.

In alternative exemplary embodiments (not shown), single-balanced mixer architectures as implemented in FIG. 5 may similarly be adopted in mixers 340I, 341I of second I path 307I and mixers 340Q, 341Q of second Q path 307Q. Such alternative exemplary embodiments are contemplated to be within the scope of the present disclosure.

Further aspects of the present disclosure relate to providing cross-coupling capacitors between the first and second signal paths to improve blocker rejection and enhance receiver linearity.

Figure 6:
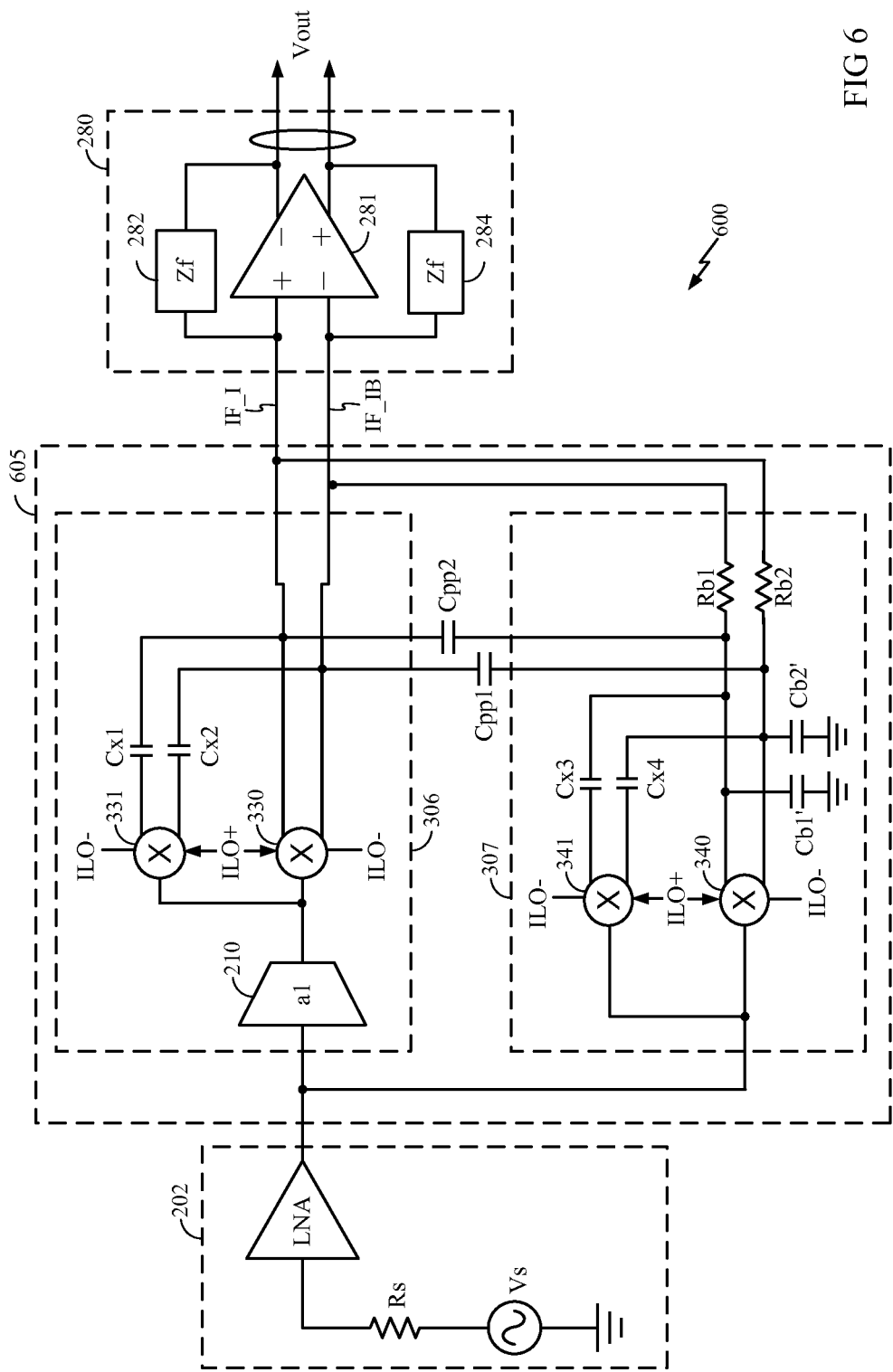
FIG. 6 illustrates an exemplary embodiment of the present disclosure baseband blocker filtering (BBBF) technique by incorporating cross-coupling capacitors between the first and second signal paths.

FIG. 6 illustrates an exemplary embodiment of the present disclosure incorporating cross-coupling capacitors between the first and second signal paths. Note FIG. 6 is shown for illustrative purposes only, and is not meant to limit the scope of the present disclosure.

In FIG. 6, cross-coupling capacitors Cpp1, Cpp2 couple terminals of the differential output of mixer 330 in first signal path 306 with corresponding terminals of the differential output of mixer 340 in second signal path 307. Providing Cpp1, Cpp2 in the manner shown advantageously directs blocker current from second signal path 307 through Cpp1, Cpp2 to add in anti-phase with blocker current present in first signal path 306 to further reject blocker components and enhance linearity. In particular, the phase of the differential current output by each of the mixers will depend on the phase of the LO signal driving the corresponding mixer. By properly connecting the output first mixer 330 with the output of second mixer 340 based on the phase of the LO driving each mixer, blocker current may be effectively cancelled out while desired RX current may be amplified. In an exemplary embodiment, the capacitances of Cpp1 and Cpp2 may be equal to each other, e.g., both equal to a common value Cpp.

Figure 7:
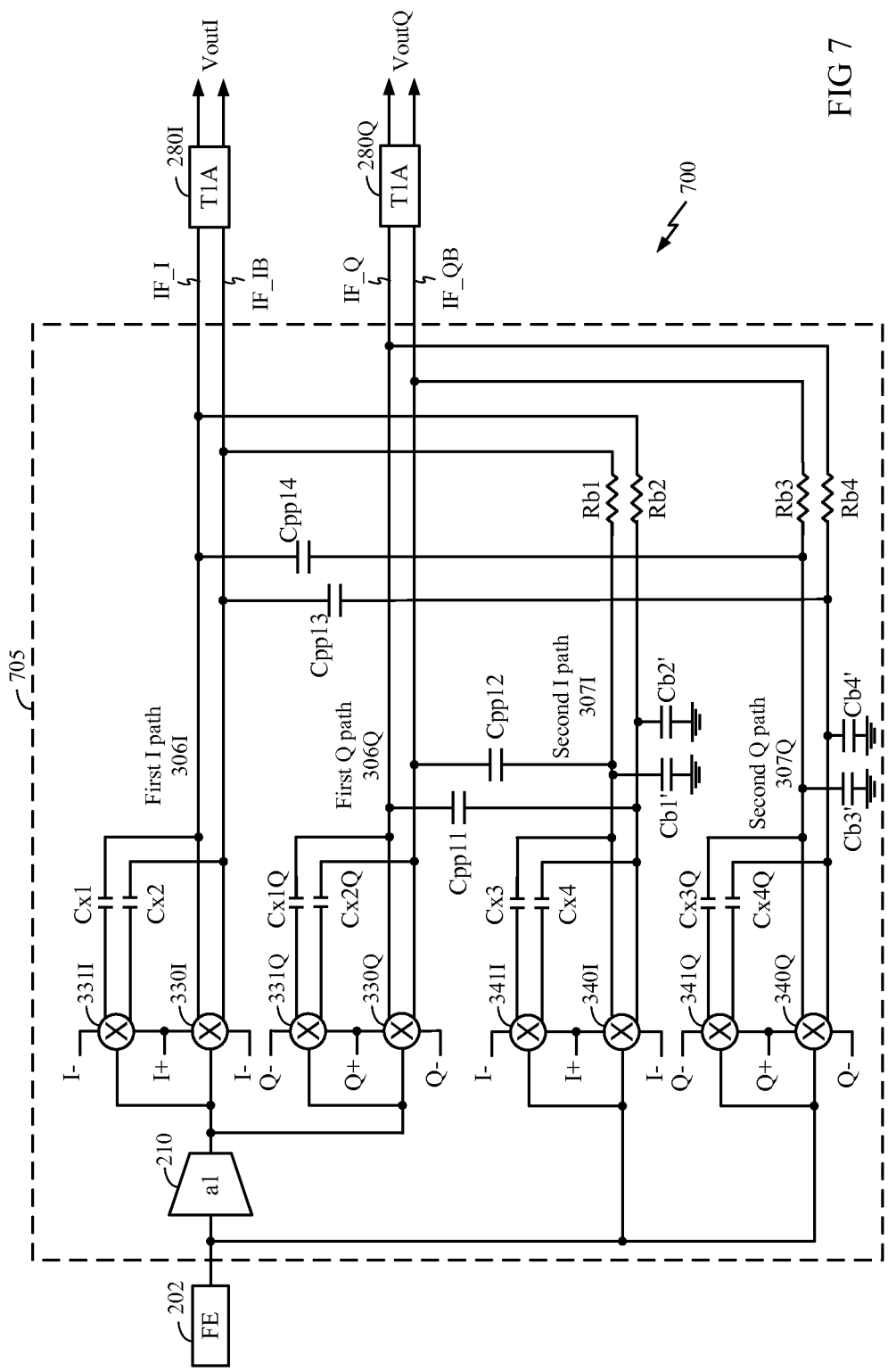
FIG. 7 illustrates an exemplary embodiment of a receiver incorporating cross-coupling capacitors between two (e.g., in-phase and quadrature) first signal paths and two (e.g., in-phase and quadrature) second signal paths.

In an exemplary embodiment, techniques for providing cross-coupling capacitors between first and second signal paths may also be applied to receive signal paths incorporating quadrature or other multi-phase down-conversion mixers. In particular, capacitors can be further provided to cross-couple the separate I and Q channels of a quadrature down-conversion receiver. FIG. 7 illustrates an exemplary embodiment 700 of a receiver incorporating cross-coupling capacitors between two (e.g., in-phase and quadrature) first signal paths and two (e.g., in-phase and quadrature) second signal paths, in a configuration also denoted herein as a baseband poly-phase cross-coupling blocker filtering configuration.

It will be appreciated that by cross-coupling the outputs of the mixers in the manner shown, a one-sided notch response can be created to reject a blocker having a known frequency offset from the receive signal (e.g. strong TX signal in a FDD system). The notch frequency can be relocated to the other side of the LO frequency by swapping the polarity of the coupling between the I and the Q paths. It will be appreciated that the offset of the notch frequency can generally be selected by appropriately setting the value of Cpp and transconductance of 210.

In FIG. 7, cross-coupling capacitors Cp11, Cp12 couple the differential output of first Q mixer 330Q to the differential output of second I mixer 340I in the manner shown. Furthermore, cross-coupling capacitors Cp13, Cp14 couple the differential output of first I mixer 330Q to the differential output of second Q mixer 340Q in the manner shown.

It will be appreciated that the cross-coupling capacitors may advantageously provide anti-phase coupling at frequencies beyond the signal band of interest. In particular, the signals processed by the first signal path may be inverted by a trans-conductance gain $-1/|Z_{oLNA}|$, e.g., in those exemplary embodiments wherein a1 corresponds to $-1/|Z_{oLNA}|$, while the signals processed by the second signal path are not inverted. In this manner, blocker current in the second signal path may be directed through the cross-coupling capacitors and coupled in anti-phase to blocker current in the first signal path, thus further rejecting blocker components and enhancing linearity. It will be appreciated that exemplary embodiment 700 may be designed to provide notch filtering to reject a blocker at a predetermined frequency offset (e.g. a strong TX blocker signal in a FDD system) from the receive signal. Note that these benefits may be achieved without added noise penalty.

In an exemplary embodiment, Cpp11, Cpp12, Cpp13, Cpp14 may be equal to a common value, e.g., Cppx, which may have a different value from Cpp described with reference to FIG. 6.

Figure 8:
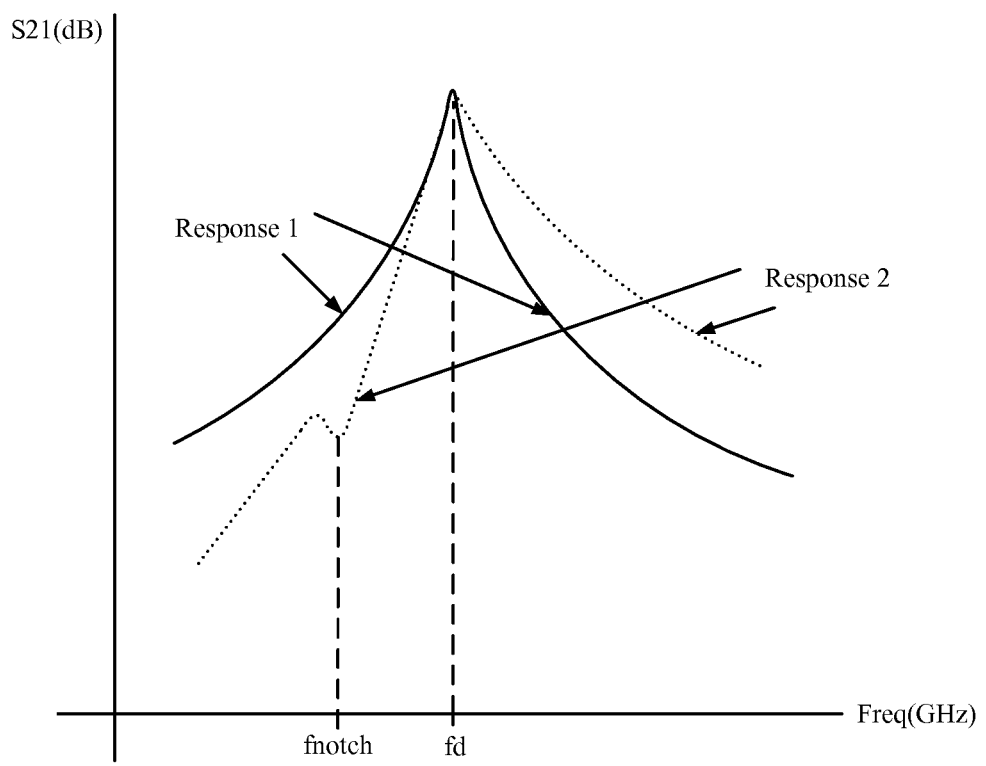
FIG. 8 shows an illustrative filtering response of blocker rejection techniques according to the present disclosure.

It will be appreciated that the techniques described hereinabove provide improved rejection against out-of-band blockers on both low and high sides of the RF frequency response. This is illustrated in FIG. 8, which shows an illustrative filtering frequency response of blocker rejection techniques according to the present disclosure. In FIG. 8, the horizontal axis plots frequency as measured in, e.g., gigahertz (GHz), while the vertical axis plots a magnitude of a transfer function, e.g., an S21 scattering parameter as known in the art, in units of, e.g., decibels (dB). Note the response of FIG. 8 is not meant to limit the scope of the present disclosure to any particular frequency ranges or S21 magnitudes shown.

In FIG. 8, the labeled "Response 1" (i.e., solid line) corresponds to an illustrative plot of frequency-dependent S21 magnitude (e.g., with port 1 corresponding to the input to LNA 201 considering a 50-Ohm matching impedance, and port 2 corresponding to the output of TIA 280) of an exemplary receiver front end not incorporating cross-coupling capacitors (e.g., exemplary embodiment 300 of FIG. 3), while the labeled "Response 2" (i.e., dotted line) corresponds to an illustrative plot of frequency-dependent S21 magnitude of a baseband poly-phase cross-coupling blocker filtering configuration (e.g., exemplary embodiment 700 of FIG. 7). Note each of frequency responses "Response 1" and "Response 2" includes a high-side response and a low-side response, i.e., low-side response to the left of center frequency fd, and high-side response to the right of fd as shown in FIG. 8. In particular, it will be noted that the left side (i.e., frequencies less than fd) of Response 2 includes a notch characteristic at frequency fnotch, wherein fnotch may be determined by characteristics of the R-C network at the mixer outputs. Note the right side (i.e., frequencies greater than fd) of Response 2 shows rejection at all frequency offsets.

Figure 9:
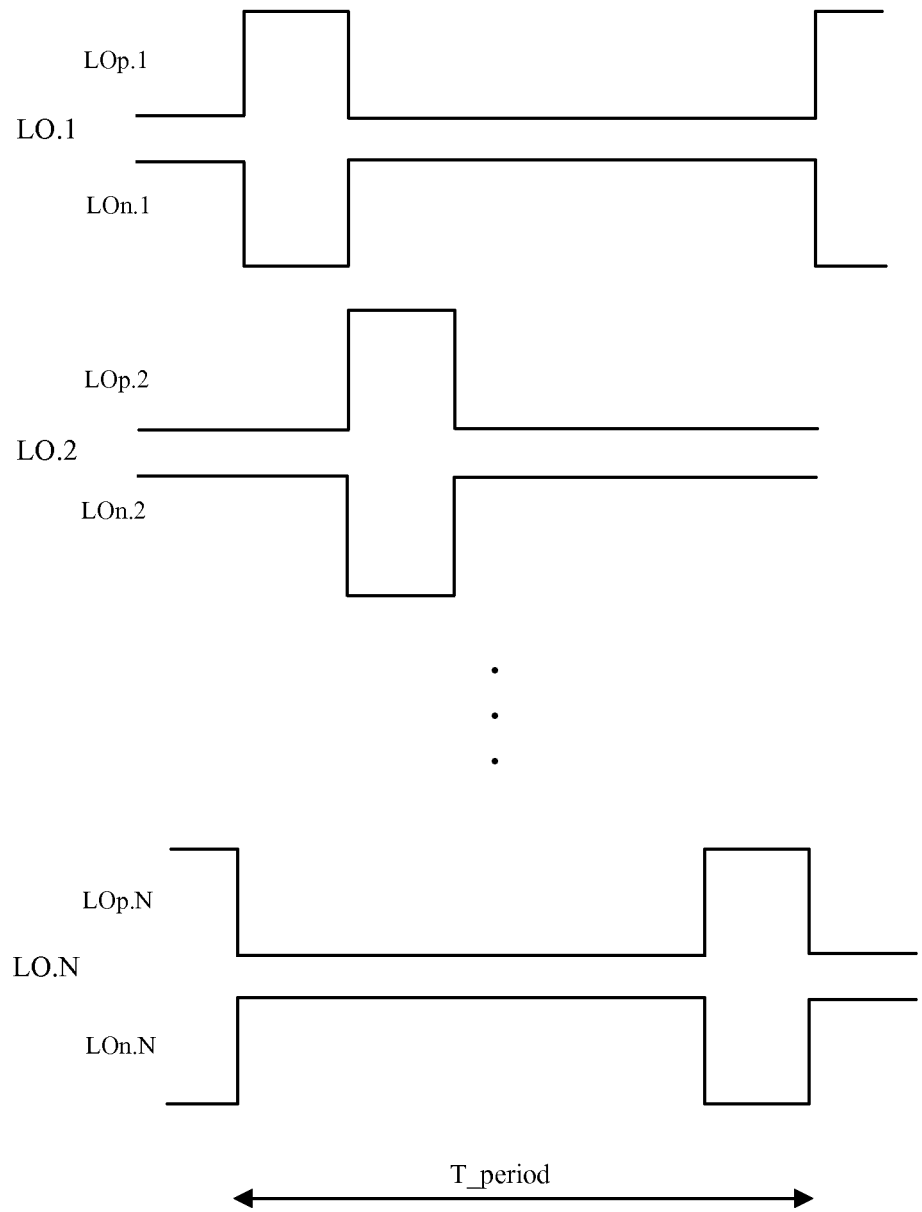
FIG. 9 illustrates an exemplary scheme for driving local oscillators having multiple phases.

In an exemplary embodiment, the techniques described herein may readily be applied to receive signal paths incorporating multi-phase down-conversion. FIG. 9 illustrates an exemplary scheme for driving local oscillators having multiple phases. In FIG. 9, a plurality N of differential local oscillator (LO) signals is shown, each differential LO signal having the same frequency (characterized by period T_period) but a different (e.g., non-overlapping) phase with respect to the other LO signals. In particular, a first differential LO signal LO.1 includes a positive signal LOp.1 and a negative signal LOn.1. A second differential LO signal LO.2 includes LOp.2 and LOn.2, and is generally offset in phase from first differential LO signal LO.1. Up to N differential LO signals are present in an N-phase down-conversion scheme, and it will be appreciated that N may generally be any number depending on the system design. It will be appreciated that choosing a large number N for the multi-phase mixing scheme may advantageously suppress undesired spurious harmonic components that may be generated by a switching mixer driven by one phase only.

In an exemplary embodiment, LO.1 may be, e.g., 180/N degrees out of phase with LO.2, etc. In general, a multi-phase mixing scheme may be implemented for an arbitrary number N of phases corresponding respectively to N first and second signal paths. It will be appreciated that a larger number of phases N for the mixing scheme may advantageously suppress the undesired harmonic response of a switching mixer driven by one phase only. Exemplary embodiments incorporating such multi-phase mixing schemes are contemplated to be within the scope of the present disclosure.

One of ordinary skill in the art will readily appreciate that the techniques disclosed herein with reference to, e.g., FIGS. 2, 3, 4, 6, 8, etc., may readily be adapted for multi-phase down-conversion schemes. For example, in an exemplary embodiment (not shown), a receive signal path may be augmented to include more than the two first signal paths 306I, 306Q shown in receive signal path 400 of FIG. 4, and further more than two second signal paths having differential outputs coupled to the corresponding outputs of the more than two first signal paths. Each of such more than two first and/or second signal paths would be driven by a corresponding differential LO signal, such as one of the LO's shown in the multi-phase LO scheme of FIG. 9, and each of such first and/or second signal paths may include single- or double-balanced mixers as described hereinabove. Such alternative exemplary embodiments are contemplated to be within the scope of the present disclosure.

Figure 10:
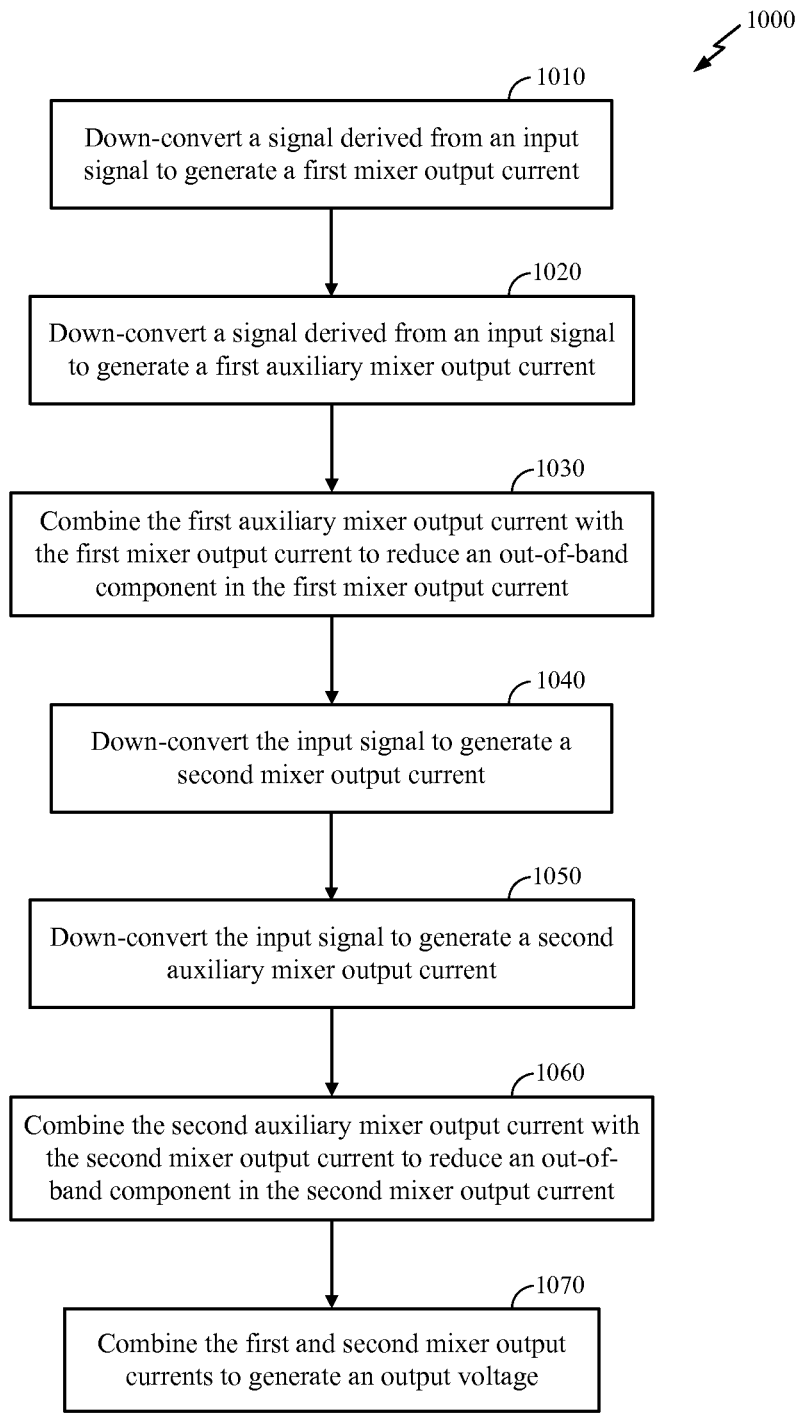
FIG. 10 illustrates an exemplary embodiment of a method according to the present disclosure.

FIG. 10 illustrates an exemplary embodiment of a method 1000 according to the present disclosure. Note FIG. 10 is shown for illustrative purposes only, and is not meant to limit the scope of the present disclosure to any particular method shown.

In FIG. 10, at block 1010, a signal derived from an input signal is down-converted to generate a first mixer output current.

At block 1020, the signal derived from the input signal is down-converted to generate a first auxiliary mixer output current.

At block 1030, the first auxiliary mixer output current is combined with the first mixer output current to reduce an out-of-band component in the first mixer output current.

At block 1040, the input signal is down-converted to generate a second mixer output current.

At block 1050, the input signal is down-converted to generate a second auxiliary mixer output current.

At block 1060, the second auxiliary mixer output current is combined with the second mixer output current to reduce an out-of-band component in the second mixer output current.

At block 1070, the first and second mixer output currents are combined to generate an output voltage.

Figure 11:
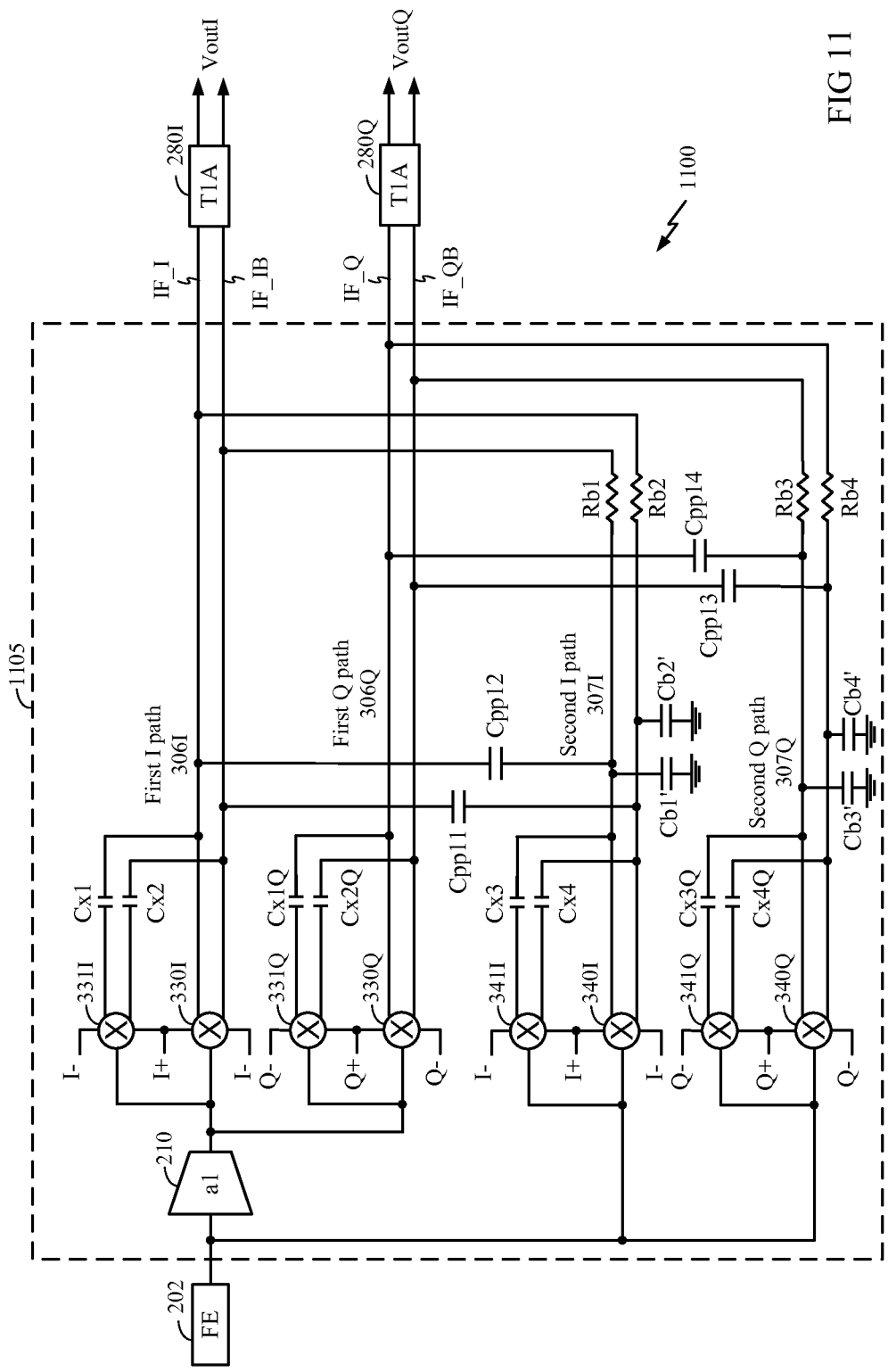
FIGS. 11 and 12 further illustrate alternative exemplary embodiments of noise cancelling receivers accommodating in-phase and quadrature down-conversion paths according to the present disclosure.
Figure 12:
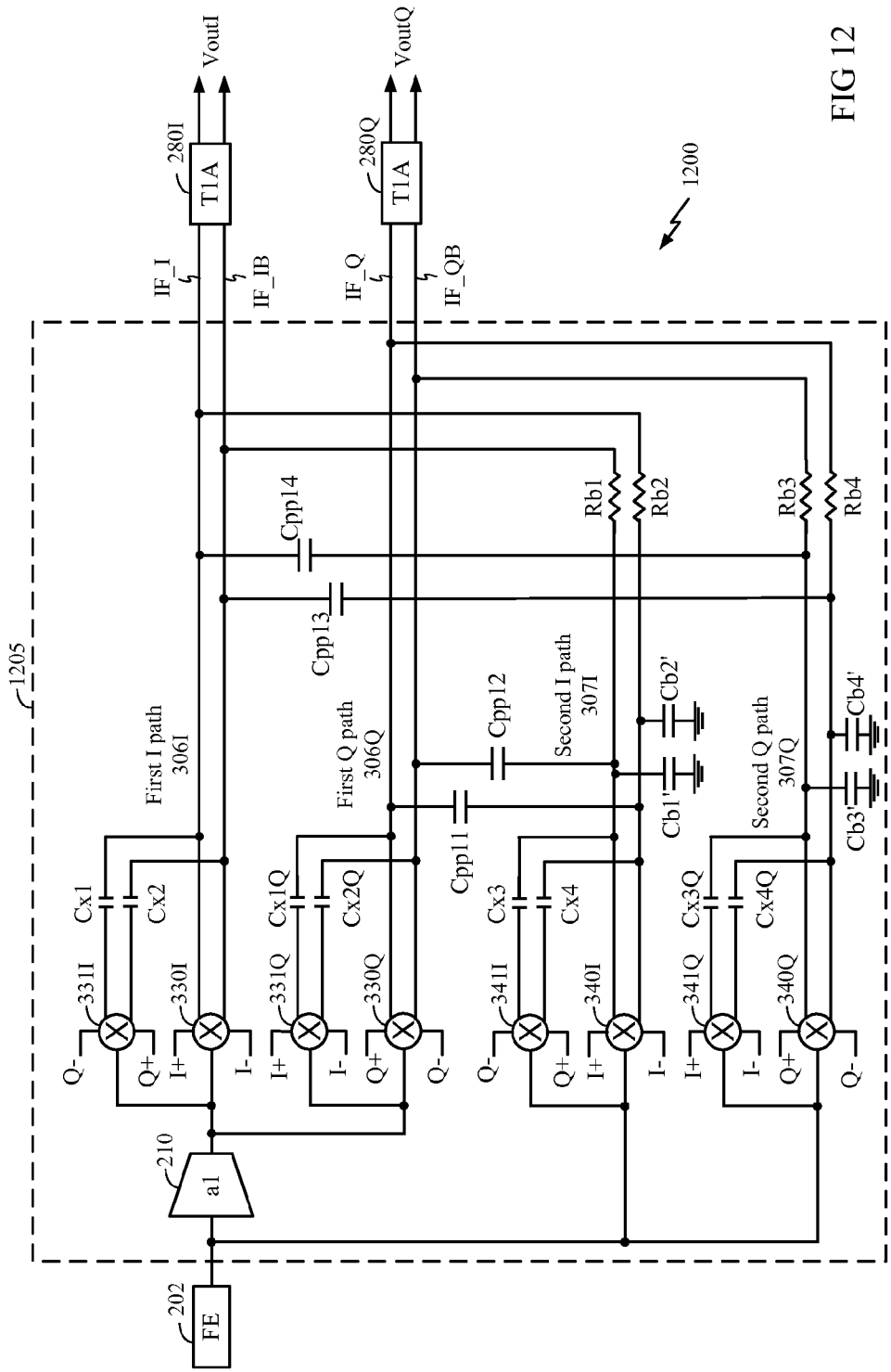

FIGS. 11 and 12 further illustrate alternative exemplary embodiments 1100 and 1200 of noise cancelling receivers accommodating in-phase and quadrature down-conversion paths according to the present disclosure.

In FIG. 11, receive signal path 1105 includes cross-coupling capacitors Cpp11, Cpp12 coupling the differential output of first I path 306I to the differential output of second I path 307I. Receive signal path 1105 further includes cross-coupling capacitors Cpp13, Cpp14 coupling the differential output of first Q path 306Q to the differential output of second Q path 307Q.

In FIG. 12, receive signal path 1205 includes first auxiliary I mixer 331I being coupled to quadrature LO signal (Q−, Q+), and first I mixer 330I being coupled to in-phase LO signal (I+, I−). It will be appreciated that shifting the phase of the LO driving first auxiliary I mixer 331I by 90 degrees relative to the phase of the LO driving corresponding first I mixer 330I may advantageously improve interference cancellation, since current through a capacitor (e.g., Cx1, Cx2) is phase-shifted by 90 degrees relative to the voltage across it. Similar considerations may be applied to shift the phases of the LO's driving first auxiliary Q mixer 331Q relative to first Q mixer 330Q, second auxiliary I mixer 341I relative to second I mixer 340I, and second auxiliary Q mixer 341Q relative to second Q mixer 340Q. The result of utilizing the combined 90 degree phase shift of the LO signal and the capacitor voltage to current transfer function is that input frequencies either above or below the frequency of the LO will be suppressed in the baseband output, while frequencies on the other side of the LO will experience gain. This is because the LO phase shift between I and Q appears as +90 degrees on one side of the LO when translated to baseband and a −90 degrees on the other side. The upper side or low side rejection can be selected by coupling mixer outputs corresponding to mixer LO phases of I+ and Q− to IF_I and Q+ and I+ to IF_Q or alternatively I+ and Q+ to IF_I and and Q+ and I− to IF_Q. The configuration of FIG. 12 may be advantageous for low IF receives as it provides image rejection in the mixer downconversion.

Note the technique of applying a 90-degree phase offset to LO's driving auxiliary mixers need not be restricted to noise cancelling receivers accommodating both I and Q down-conversion paths and cross-coupling capacitors as shown in FIG. 12, but may generally be adopted in any of the noise cancelling receiver architectures shown herein (e.g., FIG. 3, FIG. 4, etc.).

It will be appreciated in view of the configurations disclosed in FIGS. 11 and 12 that various alternative cross couplings and LO driving schemes (not explicitly shown herein) are possible in view of the present disclosure. For example, rather than being driven by (Q−, Q+), first auxiliary I mixer 331I may instead be driven by (Q+, Q−). Similar variations may be applied to all mixer pairs described herein. In a multi-phase LO exemplary embodiment, the relative phase difference applied to an auxiliary mixer LO may be configured depending on the number of phases N present in the multi-phase LO system. In alternative exemplary embodiments (not shown), the relative phase difference applied to an auxiliary mixer LO may optionally incorporate an additional tuning phase adjustment tuning component (e.g., a fine tuning component of about 1 or 2 degrees, or a coarse tuning component greater than 45 degrees) designed to optimize interference cancellation based on the specific system parameters, e.g., circuit topology, specific known interferers, etc. Such alternative exemplary embodiments are contemplated to be within the scope of the present disclosure.

One of ordinary skill in the art will appreciate that while exemplary embodiments of the present disclosure have been described with reference to MOS transistors (MOSFET's), the techniques of the present disclosure need not be limited to MOSFET-based designs, and may be readily applied to alternative exemplary embodiments (not shown) employing bipolar junction transistors (or BJT's) and/or other two-terminal or three-terminal devices. For example, in an exemplary embodiment (not shown), any of the comparators shown may utilize BJT's rather than MOSFET's, with the collectors, bases, and emitters of the BJT's coupled as shown for the drains, gates, and sources, respectively, of the MOSFET's. Alternatively, in BiCMOS processes, a combination of both CMOS and bipolar structures/devices may be employed to maximize the circuit performance. Furthermore, it will be appreciated that certain exemplary embodiments (not shown) of mixers may utilize non-transistor implementations, e.g., two-terminal diode implementations of passive mixers. Such alternative exemplary embodiments are contemplated according to the present disclosure.

Unless otherwise noted, in this specification and in the claims, the terms "drain," "gate," and "source" may encompass both the conventional meanings of those terms associated with MOSFET's, as well as the corresponding nodes of other three-terminal transconductance devices, such as BJT's, which correspondence will be evident to one of ordinary skill in the art of circuit design.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In one or more exemplary embodiments, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. An apparatus comprising:
  a first mixer configured to mix a signal derived from an input signal with a local oscillator (LO) signal to generate a first mixer output;
  a first auxiliary mixer configured to mix the signal derived from the input signal with the LO signal to generate a first auxiliary mixer output, the first auxiliary mixer output coupled to the first mixer output to reduce an out-of-band component in the first mixer output;
  a second mixer configured to mix the input signal with the local oscillator (LO) signal to generate a second mixer output;
  a second auxiliary mixer configured to mix the input signal with the LO signal to generate a second auxiliary mixer output, the second auxiliary mixer output coupled to the second mixer output to reduce an out-of-band component in the second mixer output; and
  a trans-impedance amplifier configured to sum the first and second mixer outputs to generate an output voltage.

2. The apparatus of claim 1, each of the first, first auxiliary, second, and second auxiliary mixers comprising a single-balanced mixer.

3. The apparatus of claim 1, the first mixer output coupled to the first auxiliary mixer output by a high-pass filter.

4. The apparatus of claim 3, the high-pass filter comprising a capacitor.

5. The apparatus of claim 1, further comprising cross-coupling capacitors coupling the first and second mixer outputs to each other.

6. The apparatus of claim 1, further comprising:
a first Q mixer configured to mix the signal derived from the input signal with a quadrature local oscillator (LO) signal to generate a first Q mixer output;
a first auxiliary Q mixer configured to mix the signal derived from the input signal with the quadrature LO signal to generate a first auxiliary Q mixer output, the first auxiliary Q mixer output coupled to the first Q mixer output to reduce an out-of-band component in the first Q mixer output;
a second Q mixer configured to mix the input signal with the quadrature local oscillator (LO) signal to generate a second Q mixer output;
a second auxiliary Q mixer configured to mix the input signal with the quadrature LO signal to generate a second auxiliary Q mixer output, the second auxiliary Q mixer output coupled to the second Q mixer output to reduce an out-of-band component in the second Q mixer output.

7. The apparatus of claim 6, further comprising cross-coupling capacitors coupling the first Q mixer output to the second mixer output, and the second Q mixer output to the first mixer output.

8. The apparatus of claim 6, further comprising:
an in-phase trans-impedance amplifier configured to sum the first mixer output and the first auxiliary mixer output; and
a quadrature trans-impedance amplifier configured to sum the first Q mixer output and the first Q auxiliary mixer output.

9. The apparatus of claim 1, further comprising:
at least one multi-phase first mixer configured to mix the signal derived from the input signal with a corresponding multi-phase LO signal;
at least one additional multi-phase first auxiliary mixer configured to mix the signal derived from the input signal with the corresponding multi-phase LO signal to generate at least one multi-phase first auxiliary mixer output, the at least one multi-phase first auxiliary mixer output coupled to the first mixer output to reduce an out-of-band component in the at least one multi-phase first mixer output;
at least one multi-phase second mixer configured to mix the input signal with the corresponding multi-phase local oscillator (LO) signal to generate at least one multi-phase second mixer output; and
at least one multi-phase second auxiliary mixer configured to mix the input signal with the corresponding multi-phase LO signal to generate at least one multi-phase second auxiliary mixer output, the at least one multi-phase second auxiliary mixer output coupled to the at least one multi-phase second mixer output to reduce an out-of-band component in the at least one multi-phase second mixer output.

10. The apparatus of claim 1, wherein the phase of a local oscillator coupled to the first auxiliary mixer is offset relative to the phase of a local oscillator coupled to the first mixer by 90 degrees.

11. An apparatus comprising:
means for down-converting a signal derived from an input signal to generate a first mixer output current;
means for down-converting the signal derived from the input signal to generate a first auxiliary mixer output current;
means for combining the first auxiliary mixer output current with the first mixer output current to reduce an out-of-band component in the first mixer output current;
means for down-converting the input signal to generate a second mixer output current;
means for down-converting the input signal to generate a second auxiliary mixer output current;
means for combining the second auxiliary mixer output current with the second mixer output current to reduce an out-of-band component in the second mixer output current;
means for combining the first and second mixer output currents to generate an output voltage.

12. The apparatus of claim 11, further comprising means for cross-coupling the first mixer output current to the second mixer output current.

13. The apparatus of claim 11, further comprising:
means for down-converting the signal derived from the input signal to generate a first Q mixer output current;
means for down-converting the signal derived from the input signal to generate a first auxiliary Q mixer output current;
means for combining the first auxiliary Q mixer output current with the first Q mixer output current to reduce an out-of-band component in the first Q mixer output current;
means for down-converting the input signal to generate a second Q mixer output current;
means for down-converting the input signal to generate a second auxiliary Q mixer output current;
means for combining the second auxiliary Q mixer output current with the second Q mixer output current to reduce an out-of-band component in the second Q mixer output current;
means for combining the first and second Q mixer output currents to generate an output voltage.

14. The apparatus of claim 13, further comprising:
means for cross-coupling the first Q mixer output to the second mixer output; and
means for cross-coupling the second Q mixer output to the first mixer output.

15. The apparatus of claim 11, each of the first, first auxiliary, second, and second auxiliary mixers comprising a single-balanced mixer.

16. A method comprising:
down-converting a signal derived from an input signal to generate a first mixer output current;
down-converting the signal derived from the input signal to generate a first auxiliary mixer output current;
combining the first auxiliary mixer output current with the first mixer output current to reduce an out-of-band component in the first mixer output current;
down-converting the input signal to generate a second mixer output current;
down-converting the input signal to generate a second auxiliary mixer output current;
combining the second auxiliary mixer output current with the second mixer output current to reduce an out-of-band component in the second mixer output current;
combining the first and second mixer output currents to generate an output voltage.

17. The method of claim 16, further comprising coupling the first mixer output current to the second mixer output current using cross-coupling capacitors.

18. The method of claim 16, further comprising:
- down-converting the signal derived from the input signal to generate a first Q mixer output current;
- down-converting the signal derived from the input signal to generate a first auxiliary Q mixer output current;
- combining the first auxiliary Q mixer output current with the first Q mixer output current to reduce an out-of-band component in the first Q mixer output current;
- down-converting the input signal to generate a second Q mixer output current;
- down-converting the input signal to generate a second auxiliary Q mixer output current;
- combining the second auxiliary Q mixer output current with the second Q mixer output current to reduce an out-of-band component in the second Q mixer output current;
- combining the first and second Q mixer output currents to generate an output voltage.

19. The method of claim 18, further comprising:
- coupling the first Q mixer output to the second mixer output using cross-coupling capacitors; and
- coupling the second Q mixer output to the first mixer output using cross-coupling capacitors.

20. The method of claim 16, each of the first, first auxiliary, second, and second auxiliary mixers comprising a single-balanced mixer.

* * * * *